United States Patent
Dolling et al.

(10) Patent No.: US 7,790,139 B2
(45) Date of Patent: Sep. 7, 2010

(54) METHOD FOR PRODUCING ALUMINUM TRIHYDRATES HAVING A HIGH PORE VOLUME, ALUMINUM TRIHYDRATES PRODUCED ACCORDING TO THIS METHOD AND THE USE THEREOF

(75) Inventors: Kai Dolling, Munsterdorf (DE); Andrea Brasch, Meldorf (DE)

(73) Assignee: Sasol Germany GmbH, Hamburg (DE)

( * ) Notice: Subject to any disclaimer, the term of this patent is extended or adjusted under 35 U.S.C. 154(b) by 995 days.

(21) Appl. No.: 10/565,052

(22) PCT Filed: Jul. 16, 2004

(86) PCT No.: PCT/DE2004/001545

§ 371 (c)(1),
(2), (4) Date: Jul. 31, 2006

(87) PCT Pub. No.: WO2005/009904

PCT Pub. Date: Feb. 3, 2005

(65) Prior Publication Data

US 2006/0280676 A1  Dec. 14, 2006

(30) Foreign Application Priority Data

Jul. 17, 2003 (DE) ................. 103 32 776

(51) Int. Cl.
*C01F 7/02* (2006.01)
(52) U.S. Cl. .............. 423/625; 423/629; 502/439
(58) Field of Classification Search ............. 423/625, 423/629, 628; 502/439
See application file for complete search history.

(56) References Cited

U.S. PATENT DOCUMENTS

| | | | |
|---|---|---|---|
| 2,480,743 A | 8/1949 | Krantz, Jr. et al. | |
| 2,917,365 A | 12/1959 | Gilbert et al. | |
| 3,944,658 A * | 3/1976 | Yoldas | 423/626 |
| 4,117,106 A * | 9/1978 | Bendig et al. | 423/630 |
| 5,455,019 A | 10/1995 | Inui et al. | |
| 5,573,582 A | 11/1996 | Inui et al. | |
| 5,928,127 A | 7/1999 | Tanuma | |
| 5,935,275 A | 8/1999 | Burgard et al. | |
| 6,027,706 A * | 2/2000 | Pinnavaia et al. | 423/600 |
| 6,030,599 A | 2/2000 | Noweck et al. | |

FOREIGN PATENT DOCUMENTS

| | | |
|---|---|---|
| DE | 4344304 | 6/1994 |
| DE | 19522946 | 1/1996 |
| EP | 1193232 A1 | 3/2002 |
| WO | WO9512547 | 5/1995 |
| WO | WO 96/34829 | 11/1996 |

OTHER PUBLICATIONS

Chemical Abstract, vol. 114, No. 16, Apr. 22, 1991, Columbus, Ohio, US; Abstract No. 146327f Y. Ozaki et al. "Manufacture of Porous Spherical Alumina Particles", JP 02 302315 A (Nichias Corp.) Dec. 14, 1990.
Database CA Online Chemical Abstracts Service, Columbus, Ohio, US, Violante, A. et al. "Influence of pH, Concentration, and Chelating Power of Organic Anions on the Synthesis of Aluminum Hydroxides and Oxyhydroxides" retrieved from STN Database Accession No. 94:18406 Abstract and Clays and Clay Minerals, 28(6), 425-34.
Rompp Lexikon Online (www.roempp.com/thieme-chemistry/roempp/prod/roempp.php) (5 pages)-Jan. 15, 2004.

* cited by examiner

*Primary Examiner*—Stuart Hendrickson
*Assistant Examiner*—Richard M Rump

(57) ABSTRACT

The object of the invention is a method for the manufacture of aluminum trihydrates by hydrolysis of aluminum alcoholates in aqueous, alkaline solution with addition of organic compounds, the so manufactured aluminum trihydrates and their use as catalyst supports.

14 Claims, No Drawings

Figure 1:
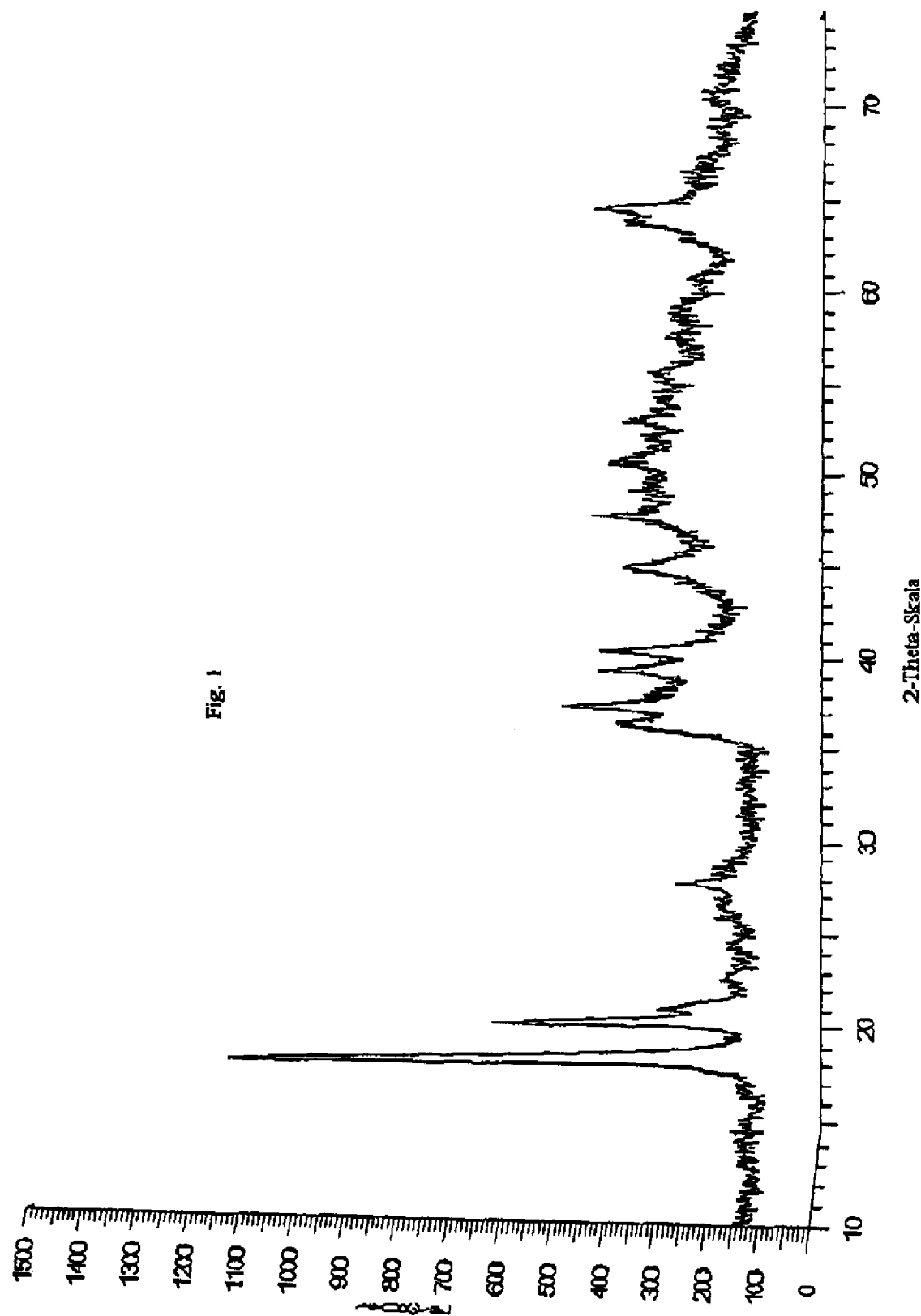

METHOD FOR PRODUCING ALUMINUM TRIHYDRATES HAVING A HIGH PORE VOLUME, ALUMINUM TRIHYDRATES PRODUCED ACCORDING TO THIS METHOD AND THE USE THEREOF

BACKGROUND OF THE INVENTION

1. Field of the Invention

The object of the invention is a method for the manufacture of aluminum trihydrate (Al(OH)$_3$) by means of hydrolysis of aluminum alcoholates in aqueous, alkaline solution with addition of organic compounds, the so-manufactured aluminum trihydrates and their use as catalyst supports.

2. Description of the Prior Art

In general three aluminum trihydroxide modifications are known, in the following called "aluminum trihydrate": Al(OH)$_3$, β-Al(OH)$_3$ and γ-Al(OH)$_3$.

α-Al(OH)$_3$ (hydrargillite, gibbsite) is a natural product occurring as bauxite. It finds its principal industrial use as an input product of industrial purity in the winning of aluminum (bauxite decomposition) and as an inexpensive starting material for manufacture of sodium aluminate.

Due to its high level of impurities naturally occuring bauxite is not suitable as a catalyst support.

β-Al(OH)$_3$ known as bayerite can be prepared by salt precipitation from aluminum sulfate and sodium aluminate solution or through hydrolysis of aluminum alcoholate. The latter variant is suitable, for preparing high purity bayerite while from the salt precipitation sodium and sulfate contaminated products precipitate. The high purity bayerite and its secondary product obtained by calcining find industrial application in the manufacture of catalyst supports. Due to the crystalline nature (crystallite size of 30 to 40 nm measured at the 311-reflex) this mistrial is not dispersable and consequently hard to process to paste-like masses for manufacture of extrudates, such as are employed in the manufacture of catalyst supports.

The manufacture of γ-Al(OH)$_3$, also called nordstrandite, is likewise known. Due to the only small differences in the physical characteristics to bayerite, nordstrandite has no special technical significance. There is also the fact that the synthesis is not economical due to higher amounts of wash water is from a technical standpoint questionable environmentally and through the duration of the synthesis being more than 3 days.

Aluminum hydroxides are manufactured by means of precipitation from aqueous solutions by utilization of a precipitation aid and other ways. Thus U.S. Pat. No. 5,928,127 describes precipitation of an aluminum oxide sol from an aqueous solution by addition of sulfonic acids.

From DE 195 22 946 furthermore a method is known for the manufacture of a finely divided aluminum hydroxide by reaction of aluminum alkoxides with other metal oxides at high shear stirring rates.

The known methods up to now for the manufacture of aluminum hydroxides have the disadvantage that the aluminum hydroxides obtained are not sufficiently pure for the manufacture of catalyst supports or are not available in a uniform modification.

SUMMARY OF THE INVENTION

It is the goal of the present invention is to make available a method for manufacture of aluminum trihydroxides (aluminum trihydrates) A1(OH)$_3$, which have a high pore volume of greater than 0.6 ml/g, preferably greater than 0.8 ml/g (determined by N$_2$ adsorption), specially preferred of greater than 1.0 ml/g and smaller crystallite sizes and higher purity, e.g. less than 40 ppm sodium and smaller than 50 ppm sulfate, as well as aluminum trihydroxide, for use as a catalyst support.

This problem is solved by means of a method in accordance with claim 1 or the other independent claims, preferred embodiments or the subject of the subclaims or described as follows.

DESCRIPTION OF PREFERRED EMBODIMENTS

The two parameters high pore volumes and small crystallite size are up to now not described for naturally occurring or industrially produced aluminum trihydrates. The avenue to these new kinds of compounds is of great significance for the further development of catalyst carriers.

The object of the invention is a method for the manufacture of high purity aluminum trihydrates Al(OH)$_3$, by means of hydrolysis of aluminum alcoholates, wherein these have at least one alcohol group, preferably 3 alcohol groups, and the alcohol groups preferably have 1 to 24, specially preferred 4 to 8 carbon atoms, in aqueous alkaline solution with addition of organic compounds, which have at least one carboxyl group and at least one amine group and preferably additionally at least one hydroxyl group. Preferably the organic compound is an amnio acid of the general formula I or its salt:

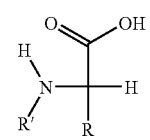

(I)

with R equal to H or a hydrocarbon group having 1 to 20 carbon atoms and if necessary other functional groups, e.g. one or two, R' equal to H, or carrying C$_1$ to C$_5$ alkyl, if necessary other functional groups, e.g. one or two, Preferably the R group of the amino acid has a hydroxyl group —OH. Specially preferred as amino acids L-serin, aspartic acid, glycine or L-leucin are employed.

So far as the organic compounds employed in accordance with the invention are present as salts, the ammonium salts, including for example the alkanolammonium salts are preferred.

In accordance with the invention the organic compound is preferably present in amounts from 0.1 to 1 wt %, specially preferred 0.2 to 0.3 wt % calculated as free acid and in relation to the total mass of the aqueous hydrolysis employed in the aqueous hydrolysis receiver.

The aluminum trihydrate manufactured according to the method in accordance with the invention is preferably present as α-Al(OH)$_3$ or as γ-Al(OH)$_3$, that is it preferably has a gibbsite or nordstrandite structure.

The hydrolysis is carried out in accordance with the invention at temperatures between 0° C. and 60° C. and specially preferred at 30° C. to 40° C. The aqueous, alkaline solution thereby preferably has a pH value from 8 to 13, especially from 9 to 12.

The aluminum trihydrates manufactured according to the method in accordance with the invention preferably have a pore volume of 0.6 to 1.5 ml/g, preferably 0.8 to 1.1 ml/g.

The object of the invention is furthermore the use of the aluminum trihydrate manufactured according to the method in accordance with the invention preferably as a catalyst support.

The method in accordance with the invention makes possible the synthesis of new type nordstrandite and gibbsite similar trihydrates through hydrolysis of aluminum alcoholates in aqueous alkaline solution with addition of organic compounds which have at least one carboxyl and one amine group. Amino acids are specially suited.

By utilization of different amino acids the connections between the nature of the side group of the amino acid employed and the trihydrate obtained are reflected. In many syntheses a mixture of bayerite, gibbsite and nordstrandite is obtained, as a rule however according to the method in accordance with the invention gibbsite and/or nordstrandite are formed.

The presence of amino acid compounds leads to aluminum trihydrates with increased pore volumes. Amino acids like L-leucin, glycine, L-serin, L-threonine. L-aspartic acid, L-glutamic acid, L-cysteine, as well as their dimers cysteine and homocysteine lead to formation of nordstrandite and/or gibbsite-similar materials.

In the use of L-leucin (side groups $—CH_2—CH—(CH_2)_2$) in the hydrolysis receiver a trihydrate with gibbsite structure precipitates. The same is true for L-cysteine, the dimer of cysteine and homocysteine in the hydrolysis receiver.

On the other hand glycine or amino acids with a hydroxide containing side group (L-serin: $R=—CH_2—OH$, aspartic acid: $R=—CH_2—COOH$) preferably lead to precipitation in the nordstrandite form. Glycine, L-serin, aspartic acid and L-threonin preferably lead to precipitation in the nordstrandite form.

An increase of the amount of amino acid in the hydrolysis receiver can hinder the trihydrate precipitation up to the complete suppression in favor of formation of an amorphous boehmite. A further lowering of the amount of amino acid favors the precipitation of bayerite. In the use of e.g. glycine, 0.25 to 0.3 wt % is to be considered as the optimal amount in the receiver applied to the hydrolysis receiver, in order to obtain as pure a nordstrandite phase as possible.

It is furthermore the object of the invention, the aluminumtrihydrates to undergo an aging process in a further step after the hydrolysis. The aging is preferable carried out between 30° C. and 100° C., especially between 40° C. and 60° C., preferably for a period of time of more than 1 h, preferably more than 2 h. Independently hereof the solid material concentration of the slurry to be aged amounts preferably to 2 to 17 wt %, preferably 3 to 5 wt %, calculated as $Al_2O_3$ and in relation to the total weight of the slurry.

The new type of trihydrate described in this method is distinguished by having a pore volume greater than 0.6, preferably greater than 0.8 ml/g. A high product purity is achieved through the manufacture that is the hydrolysis of purified aluminum alcoholate. Through a smaller crystallite size than with conventional bayerite, the trihydrates are psrtially dispersable and consequently have very good processability to paste-like masses for manufacture by extrusion.

Alkaline solutions in the sense of the invention are aqueous solutions having a pH greater than 8, preferably 9-12. The alkaline pH value of the hydrolysis receiver can however be achieved by addition of suitable substances, such as e.g. ammonia, alkali solution or pH adjusting materials.

In accordance with the invention for the manufacture of aluminum trihydrates, aluminum alcoholates are employed. The aluminum alcoholate can for example be prepared by the Ziegler method, wherein preferably a purification takes place through filtration. As aluminum alcoholates $C_1$ to $C_{24}$ alcohols or their mixtures can be employed.

EXAMPLES

Example 1a

Comparison Example 457 g of water and 23 g of a 25% ammonia solution were warmed to 30° C. in a 2 l three-neck flask. Into this receiver 400 g of aluminum hexanolate were added dropwise in under 1 hour, while stirring and holding the temperature constant. Two immiscible phases were formed, an upper alcohol phase and an alumina-water phase.

After decanting the alcohol phase the alumina-water phase after further addition of water was aged for 5 h at 30° C. with stirring. After removal of the alcohol dissolved in the water a pH value was determined between 9.5 and 10.5 was determined and the alumina slurry dried.

Example 1b

Comparison Example

For the preparation of bayerite from a salt solution, 100 g of sodium aluminate solution and 200 g of water were warmed to 30° C. in a 1 l three neck flask. Into this receiver aluminum sulfate solution was added while stirring and holding the temperature constant until a pH value of 10 was achieved. This addition was carried out in less than 45 minutes. Thereupon it was heated to 70° C. while stirring and aged while holding the temperature constant for 30 minutes. The filter cake resulting from filtration of the warm reaction mixture was washed with 1.5 l of water and dried.

Example 2

The following substances were reacted analogously to Example 1a.

| | |
|---|---|
| 464 g | water |
| 22.2 g | ammonia solution (25%) |
| 1.4 g | glycine in the receiver |
| 400 g | aluminum hexanolate |

Thereby the additional amino acid were already present along with the water and the ammonia solution in the three-neck flask before beginning the reaction.

Example 3

Test implementation and the materials and amounts employed correspond to Example 2. In deviating the alumina slurrying was undergone before the 16 h drying at 50° C. with stirring for further aging.

Example 4

Nordstrandite

Test implementation took place analogously to Example 1a with the following added amounts:

| | |
|---|---|
| 232 g | water |
| 11.1 g | ammonia solution (25%) |
| 0.6 g | L-aspartic acid in the receiver |
| 200 g | aluminum hexanolate |

Example 5

Comparison Example, not in Accordance with the Invention

Test implementation took place analogously to Example 1a with the following added amounts:

| | |
|---|---|
| 232 g | water |
| 11.1 g | ammonia solution (25%) |
| 1.2 g | L-aspartic acid in the receiver |
| 200 g | aluminum hexanolate |

The test 5 was carried out with a higher amount of L-aspartic acid. The product obtained showed a boehmite structure as a result of the X-Ray structure analysis.

Example 6

Nordstrandite

Test implementation took place analogously to Example 1a with the following added amounts:

| | |
|---|---|
| 232 g | water |
| 11.1 g | ammonia solution (25%) |
| 1.2 g | L-serin in the receiver |
| 200 g | aluminum hexanolate |

Example 7

Gibbsite/Bayerite

Test implementation took place analogously to Example 1a with the following added amounts:

| | |
|---|---|
| 232 g | water |
| 11.1 g | ammonia solution (25%) |
| 1.2 g | L-leucin in the receiver |
| 200 g | aluminum hexanolate |

Example 8

Gibbsite/Boehmite

Test implementation took place analogously to example 1a with the following added amounts:

| | |
|---|---|
| 232 g | water |
| 11.1 g | ammonia solution (25%) |
| 0.6 g | L-cysteine acid in the receiver |
| 200 g | aluminum hexanolate |

Example 9

Bayerite

Implementation took place analogously to Example 1a with the following added amounts:

| | |
|---|---|
| 232 g | water |
| 11.1 g | ammonia solution (25%) |
| 0.6 g | L-tyrosine in the receiver |
| 200 g | aluminumhexanolate |

Example 10

Comparison Example 500 g of 20% ethylenediamine solution was warmed to 30° C. in a 1 l three-neck flask. Into this receiver 12.5 g of aluminum was added in powder form in portions in less than a half an hour with stirring. Thereupon it was heated to 50° C. and held 3 days at this temperature with light stirring. After addition of a further 50 g of ethylenediamine it was lightly stirred for a further 4 days. The reaction mixture was now filtered and the resulting filter cake after being washed with water and ethanol was dried.

The phase behavior was determined by means of STA. The Simultaneous Thermal Analysis (STA) comprises the Differential Thermal Analysis (DSC) and the Thermogravimetry (TG). The heat-up rate amounted to 10 K/min with air flushing. The surface area of the aluminum oxide was determined by means of an $N_2$ sorption technique according to BET (DIN 66131). The pore volume and the average pore radius were determined by means of $N_2$ sorption according to BJH (DIN 66134).

Figure 2:
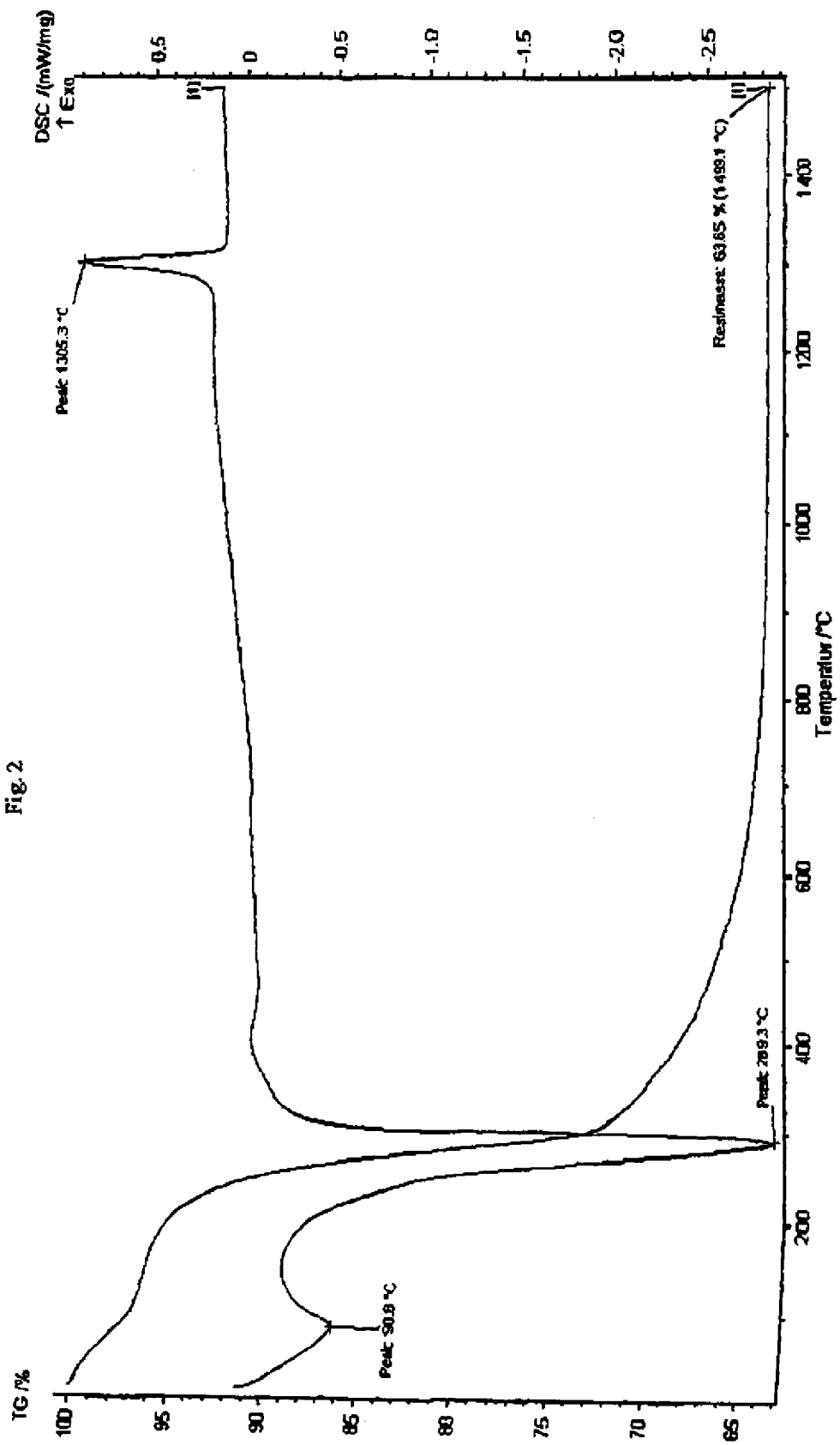

In FIG. 1 the X-ray diffraction diagram (Drucker AXS, D5000, with scintillation counter and $Cu_{K\alpha}$ radiation, $2\theta=6$ to 80°) and in FIG. 2 the DSC/TG from Example 2 is presented.

TABLE 1

Properties of the Products of Examples 1 through 10

| # | Phase 1t. XRD | Surface Area m²/g | Pore Volumes* ml/g | Avge. Pore Radius* nm |
|---|---|---|---|---|
| 1a | bayerite | 277 | 0.39 | 3 |
| 1b | bayerite | 311 | 0.37 | 3 |
| 2 | nordstrandite + little bayerite | 272 | 0.89 | 6 |
| 3 | nordstrandite + little bayerite | 286 | 1.04 | 7 |
| 4 | nordstrandite + little bayerite | 266 | 0.81 | 6 |
| 5 | boehmite | 293 | 0.51 | 3 |
| 6 | nordstrandite + little bayerite | 267 | 0.76 | 6 |
| 7 | amorph. Gibbsite + little bayerite | 269 | 0.70 | 5 |
| 8 | amorph. Gibbsite + little bayerite | 303 | 0.63 | 4 |
| 9 | bayerite | 264 | 0.71 | 2 |
| 10 | nordstrandite (Hauschild) | 214 | 0.25 | 2 |

*the activation temperature was 550° C. for 3 hours

The invention claimed is:

1. A method for the manufacture of an aluminum trihydrate comprising hydrolyzing an aluminum alcoholate at 0° C. to 60° C. in an aqueous hydrolysis solution at a pH value greater than 8 in the presence of at least one organic compound having 2 to 24 carbon atoms or the salt thereof, said organic compound having at least one amino group and at least one carboxyl group.

2. The method in accordance with claim 1 characterized in that the organic compounds have an amino group in the α, β, or γ position, relative to the carboxyl group.

3. The method in accordance with claim 1 characterized in that the organic compound is an amino acid of general formula I

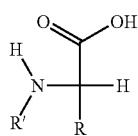

(I)

wherein R is H or a hydrocarbon group with 1 to 20 carbon atoms with if necessary one or a plurality of functional groups, and R' is H, or a $C_1$ to $C_5$ alkyl with if necessary one or a plurality of functional groups.

4. The method in accordance with any one of the claims 1, 2 or 3 characterized in that the organic compound has furthermore at least one hydroxyl group.

5. The method in accordance with one of the claims 1, 2 or 3, characterized in that the organic compound is L-serin, aspartic acid, glycine and/or L-leucin.

6. The method in accordance with any one of claims 1, 2 or 3 characterized in that the organic compound is present at 0.01 to 1 wt%, preferably at 0.2 to 0.5 wt% based on the total weight of the hydrolysis solution.

7. The method in accordance with any one of claims 1, 2 or 3 characterized in that the manufactured aluminum trihydrates have a nordstrandite or gibbsite structure.

8. The method in accordance with any one of claims 1, 2 or 3 characterized in that the hydrolysis is carried out at temperatures between 20° C. and 60° C., preferably between 30° C. and 40° C.

9. The method in accordance with any one of claims 1, 2 or 3 characterized in that aluminum alcoholates are added to the hydrolysis solution in a weight ratio, referring to aluminum alcoholate to hydrolysis solution of 1 to 0.7 to 1 to 3.

10. The method in accordance with any one of claims 1, 2 or 3 characterized in that in a further step after the hydrolysis the aluminum trihydrate compound undergoes a hydrothermal aging, preferably above for at least 1 h.

11. The method according to claim 10, characterized in that the hydrothermal aging at temperatures is carried out between 30° C. and 100° C., preferably between 40° C. and 60° C.

12. The method according to claim 11, characterized in that the hydrothermal aging is carried out in a solid material slurry with a solid material concentration from 2 to 25 wt%, preferably 3 to 5 wt%, calculated as $Al_2O_3$ and in relation to the total weight of the solid material slurry.

13. The method in accordance with any one of claims 1, 2 or 3 characterized in that the method furthermore comprises the step of calcining of the produced aluminum trihydrates with predominantly bayerite, nordstrandite and/or gibbsite structure for the manufacture of calcined alumina.

14. The method in accordance with claim 13, characterized in that the method comprises the calcining of aluminum trihydrates with predominantly nordstrandite and/or gibbsite structure.

* * * * *

UNITED STATES PATENT AND TRADEMARK OFFICE
CERTIFICATE OF CORRECTION

| | | |
|---|---|---|
| PATENT NO. | : 7,790,139 B2 | |
| APPLICATION NO. | : 10/565052 | |
| DATED | : September 7, 2010 | |
| INVENTOR(S) | : Kai Dolling and Andrea Brasch | |

It is certified that error appears in the above-identified patent and that said Letters Patent is hereby corrected as shown below:

Delete the title page and substitute therefore the attached title page showing new drawing sheets added.

Attached are Figs. 1 and 2 of the PCT/DE2004/001545 which were previously missing.

Col. 1, l. 35 should read "material" instead of "mistrial".

Col. 1, l. 63 delete the word "is" after the word "invention".

Col. 3, l. 56 should read "partially" instead of "psrtially".

Col. 4, ll. 59-60 should read "...slurrying was undergone stirring for 16 h at 50° C for further aging before drying" instead of "... slurrying was undergone before the 16 h drying at 50° C with stirring for further aging."

Col. 8, l. 24 change the letter "O" instead of number "0" before the words "... and in relation to the..."

Signed and Sealed this
First Day of March, 2011

David J. Kappos
*Director of the United States Patent and Trademark Office*

(12) United States Patent
Dolling et al.

(10) Patent No.: US 7,790,139 B2
(45) Date of Patent: Sep. 7, 2010

(54) METHOD FOR PRODUCING ALUMINUM TRIHYDRATES HAVING A HIGH PORE VOLUME, ALUMINUM TRIHYDRATES PRODUCED ACCORDING TO THIS METHOD AND THE USE THEREOF

(75) Inventors: Kai Dolling, Munsterdorf (DE); Andrea Brasch, Meldorf (DE)

(73) Assignee: Sasol Germany GmbH, Hamburg (DE)

( * ) Notice: Subject to any disclaimer, the term of this patent is extended or adjusted under 35 U.S.C. 154(b) by 995 days.

(21) Appl. No.: 10/565,052

(22) PCT Filed: Jul. 16, 2004

(86) PCT No.: PCT/DE2004/001545

§ 371 (c)(1),
(2), (4) Date: Jul. 31, 2006

(87) PCT Pub. No.: WO2005/009904

PCT Pub. Date: Feb. 3, 2005

(65) Prior Publication Data

US 2006/0280676 A1 Dec. 14, 2006

(30) Foreign Application Priority Data

Jul. 17, 2003 (DE) ............................... 103 32 776

(51) Int. Cl.
*C01F 7/02* (2006.01)
(52) U.S. Cl. ............................ 423/625; 423/629; 502/439
(58) Field of Classification Search .................. 423/625, 423/629, 628; 502/439
See application file for complete search history.

(56) References Cited

U.S. PATENT DOCUMENTS

| 2,480,743 | A |   | 8/1949  | Krantz, Jr. et al. |           |
|-----------|---|---|---------|--------------------|-----------|
| 2,917,365 | A |   | 12/1959 | Gilbert et al.     |           |
| 3,944,658 | A | * | 3/1976  | Yoldas             | 423/626   |
| 4,117,106 | A | * | 9/1978  | Bendig et al.      | 423/630   |
| 5,455,019 | A |   | 10/1995 | Inui et al.        |           |
| 5,573,582 | A |   | 11/1996 | Inui et al.        |           |
| 5,928,127 | A |   | 7/1999  | Tanuma             |           |
| 5,935,275 | A |   | 8/1999  | Burgard et al.     |           |
| 6,027,706 | A | * | 2/2000  | Pinnavaia et al.   | 423/600   |
| 6,030,599 | A |   | 2/2000  | Noweck et al.      |           |

FOREIGN PATENT DOCUMENTS

| DE | 4344304     | 6/1994  |
|----|-------------|---------|
| DE | 19522946    | 1/1996  |
| EP | 1193232 A1  | 3/2002  |
| WO | WO9512547   | 5/1995  |
| WO | WO 96/34829 | 11/1996 |

OTHER PUBLICATIONS

Chemical Abstract, vol. 114, No. 16, Apr. 22, 1991, Columbus, Ohio, US; Abstract No. 146327f Y. Ozaki et al. "Manufacture of Porous Spherical Alumina Particles", JP 02 302315 A (Nichias Corp.) Dec. 14, 1990.
Database CA Online Chemical Abstracts Service, Columbus, Ohio, US; Violante, A. et al. "Influence of pH, Concentration, and Chelating Power of Organic Anions on the Synthesis of Aluminum Hydroxides and Oxyhydroxides" retrieved from STN Database Accession No. 94:18406 Abstract and Clays and Clay Minerals, 28(6), 425-34.
Rompp Lexikon Online (www.roempp.com/thieme-chemistry/roempp/prod/roempp.php) (5 pages)-Jan. 15, 2004.

* cited by examiner

*Primary Examiner*—Stuart Hendrickson
*Assistant Examiner*—Richard M Rump

(57) ABSTRACT

The object of the invention is a method for the manufacture of aluminum trihydrates by hydrolysis of aluminum alcoholates in aqueous, alkaline solution with addition of organic compounds, the so manufactured aluminum trihydrates and their use as catalyst supports.

14 Claims, 2 Drawing Sheets